United States Patent
Degen et al.

(10) Patent No.: US 11,398,767 B2
(45) Date of Patent: Jul. 26, 2022

(54) POWER CONVERTER FOR DELAYING ENTERING BURST MODE AND METHOD THEREOF

(71) Applicant: NXP B.V., Eindhoven (NL)

(72) Inventors: Peter Theodorus Johannes Degen, Gelderland (NL); Jacobus Eduardus Henricus Maria Peeters, Noord Brabant (NL); Tsung-Pin Tang, New Taipei (TW); Edy Chandra, Taipei (TW)

(73) Assignee: NXP B.V., Eindhoven (NL)

( * ) Notice: Subject to any disclaimer, the term of this patent is extended or adjusted under 35 U.S.C. 154(b) by 843 days.

(21) Appl. No.: 15/833,711

(22) Filed: Dec. 6, 2017

(65) Prior Publication Data
US 2021/0111619 A1    Apr. 15, 2021

(51) Int. Cl.
*H02M 1/08* (2006.01)
*H02M 3/335* (2006.01)
*H02M 1/00* (2006.01)

(52) U.S. Cl.
CPC ......... *H02M 1/08* (2013.01); *H02M 3/33569* (2013.01); *H02M 1/0035* (2021.05); *H02M 1/0054* (2021.05)

(58) Field of Classification Search
CPC ............... H02M 1/08; H02M 3/33569; H02M 2001/0035; H02M 2001/0054
See application file for complete search history.

(56) References Cited

U.S. PATENT DOCUMENTS

| | | | |
|---|---|---|---|
| 8,625,308 B2 | 1/2014 | Kim | |
| 9,219,418 B2 | 12/2015 | Balakrishnan | |
| 9,531,279 B2 | 12/2016 | Mao | |
| 10,003,210 B2* | 6/2018 | Kleinpenning | H02J 7/0071 |
| 2008/0130324 A1* | 6/2008 | Choi | H02M 3/33507 363/21.03 |
| 2014/0043863 A1* | 2/2014 | Telefus | H02M 3/33592 363/17 |
| 2016/0079790 A1 | 3/2016 | Kleinpenning et al. | |
| 2016/0359412 A1 | 12/2016 | Kovacevic et al. | |
| 2019/0379293 A1* | 12/2019 | Kannan | H02M 3/33592 |
| 2020/0099310 A1* | 3/2020 | Chen | H02M 1/38 |
| 2020/0169160 A1* | 5/2020 | Kikuchi | H02M 1/4225 |
| 2020/0169176 A1* | 5/2020 | Murata | H02M 3/33569 |
| 2020/0195161 A1* | 6/2020 | Mayell | H02M 3/33515 |

OTHER PUBLICATIONS

NXP; "TEA 19161T"; Revision 1; Product Datasheet; 46 pages (Mar. 10, 2016).
NXP; TEA 1716T Product Datasheet; Rev. 3; 47 pages (Nov. 30, 2012).
Bai, Yongjiang et al., "High Efficiency Hybrid Multi-stage Adaptor with AC and DC Input Capability", Energy Conversion Congress and Exposition (ECCE), Sep. 17, 2011, pp. 1137-1142, IEEE, Piscataway, NJ, USA.

* cited by examiner

*Primary Examiner* — Kyle J Moody

(57) ABSTRACT

Various embodiments relate to a power converter including a resonant converter with an controller, the controller configured to control the converter to operate in a normal mode when output power is above a burst mode threshold level, start a timer when the output power falls below the burst mode threshold level, continue operating in the normal mode until the timer reaches a predetermined time and operate in burst mode when the timer reaches the predetermined time.

11 Claims, 9 Drawing Sheets

POWER CONVERTER FOR DELAYING ENTERING BURST MODE AND METHOD THEREOF

TECHNICAL FIELD

This disclosure relates generally to regulating a power supply, and more specifically, but not exclusively, to delay entering burst mode in a power supply.

BACKGROUND

A power supply is commonly used to supply power to electronic devices. These electronic devices can have several different modes, which include different power requirements.

For example, an electronic device such as a television may be in different modes during operation such as being powered on, only being used for audio, being powered off or performing a software update and depending on the mode of operation, the requested power level is different.

The power supply is customarily left connected to the electronic device for extended periods, even when the electronic device is powered off or in a mode other than being powered on.

For example, when using a power supply (i.e. a power adapter) to charge a mobile phone, often the mobile telephone is disconnected from the power supply when fully charged, however, many mobile telephone users keep the power supply connected to the electronic device and in this instance when the mobile telephone is fully charged, the requested power from the mobile telephone to the power supply is zero.

In order to minimize the losses of the power supply, while delivering a variety of different power levels to the electronic device, the power supply may operate in different modes.

For example, at low loads, the power supply may operate in a burst mode. However, operating in burst mode has disadvantages for the power supply.

Burst mode is a method of operating the power supply where the power supply delivers a higher amount of energy followed by a non-switching time where no energy is delivered. This method of operation provides a higher efficiency to the power supply than the alternative which is continuously delivering a lower amount of energy to the electronic device, however, has disadvantages.

The reason the power supply operating in burst mode is more efficient is that the switching losses of a converter are constant for each switching cycle and as burst mode reduces the amount of switching cycles; it also reduces the amount of switching losses.

SUMMARY OF EXEMPLARY EMBODIMENTS

A brief summary of various embodiments is presented below. Embodiments address the need to create a method and apparatus for delay entering burst mode in a power supply.

In order to overcome these and other shortcomings of the prior art and in light of the need to create a power supply for delay entering burst mode, a brief summary of various exemplary embodiments is presented. Some simplifications and omissions may be made in the following summary, which is intended to highlight and introduce some aspects of the various exemplary embodiments, but not to limit the scope of the invention.

Detailed descriptions of a preferred exemplary embodiment adequate to allow those of ordinary skill in the art to make and use the inventive concepts will follow in later sections.

Various embodiments described herein relate to a power converter including a resonant converter and a controller configured to control the converter to operate in a normal mode when output power is above a burst mode threshold level, start a timer when the output power falls below the burst mode threshold level, continue operating in the normal mode until the timer reaches a predetermined time and operate in burst mode when the timer reaches the predetermined time.

In an embodiment of the present disclosure, the controller is configured to control the resonant converter to reset the timer when the output power rises above the burst mode threshold level before the timer reaches the predetermined time.

In an embodiment of the present disclosure, the normal mode is continuously switching of transistors to maintain a required level of the output power.

In an embodiment of the present disclosure, the burst mode is switching off transistors for a period of time to supply a burst of output power.

In an embodiment of the present disclosure, switching frequency during the normal mode is above an audible area and a burst frequency during the burst mode is below the audible area.

Various embodiments described herein relate to a method for delaying entering burst mode, by a power supply including a resonant converter and a controller, the controller performing the steps of operating in a normal mode when output power is above a burst mode threshold level, starting a timer when the output power falls below the burst mode threshold level, continuing to operate in the normal mode until the timer reaches a predetermined time and operating in burst mode when the timer reaches the predetermined time.

In an embodiment of the present disclosure, the controller is configured to reset the timer when the output power rises above the burst mode threshold level before the timer reaches the predetermined time.

In an embodiment of the present disclosure, the normal mode is continuously switching of transistors to maintain a required level of the output power.

In an embodiment of the present disclosure, the burst mode is switching off transistors for a period of time to supply a burst of output power.

In an embodiment of the present disclosure, switching frequency during the normal mode is above an audible area and a burst frequency during the burst mode is below the audible area.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

These and other more detailed and specific features are more fully disclosed in the following specification, reference being had to the accompanying drawings, in which.

DETAILED DESCRIPTION OF THE INVENTION

Figure 1:
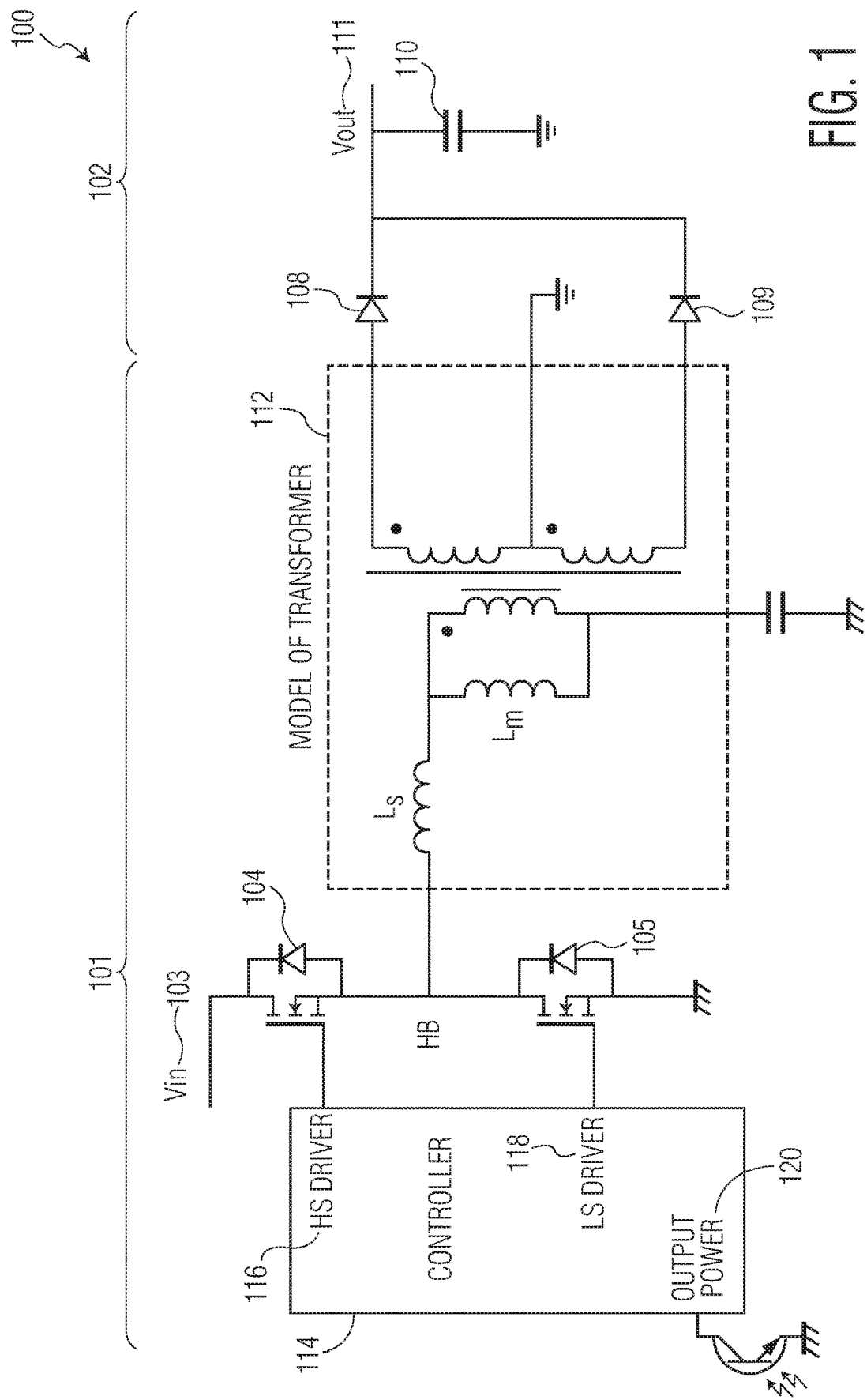
FIG. 1 illustrates a circuit diagram of a power converter using a LCC resonant converter.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable.

These embodiments reduce audible noise in a power supply using a delay in entering burst mode. By delaying entering burst mode, the switched mode power supply ("SMPS" or "power converter") system may avoid quickly entering and exiting burst mode when the load quickly rises above and falls below the minimum burst mode level which reduces audible noise from the switching.

By using a LCC resonant converter ("resonant converter"), the output power may be regulated, even regulated to zero, while the resonant converter continues switching, however, no power is being outputted during the delay period even though the resonant converter continues switching. While an example of a LLC resonant converter, the controller described herein may be used with other types of resonant converters.

The switching frequency may be slightly higher and by using this method, when the output load is fluctuating, the SMPS system does not continuously enter and exit burst mode, which may lead to audible noise.

Burst mode is a method of operating a SMPS system where the SMPS system delivers a higher amount of energy followed by a non-switching time of no energy, which leads to a higher efficiency as compared to continuously delivering a lower amount of energy to the electronic device.

The switching losses of a converter are constant for each switching cycle and therefore, as operating in burst mode reduces the amount of switching cycles, it also reduces the switching losses. During the non-switching time in burst mode, the control integrated circuit can enter a "sleep mode" which inherently consumes less power. During burst mode, the burst frequency is defined as the rate at which bursts occur.

FIG. 1 illustrates a circuit diagram of a SMPS circuit 100 including a series LLC resonant half bridge converter ("resonant LLC converter").

The SMPS circuit 100 includes a primary side 101 and a secondary side 102.

As is known in traditional SMPS, the series LCC resonant half bridge converter includes a primary side 101 which receives input voltage $V_{in}$ 103. $V_{in}$ is input via an input filter from the mains input (not illustrated). The primary side 101 receives an input voltage 103 and steps down the input voltage to a lower output voltage and generates an output current. The primary side 101 includes a high side N-channel metal oxide semiconductor field effect transistor ("MOSFET") 104 and a low side N-channel MOSFET 105. The transistors may be any other transistor or switching element, such as a bipolar transistor.

The primary side 101 further includes a resonant LCC converter 106, the primary side 101 includes components of a conventional SMPS that may be adapted to embodiments of this invention.

The transformer 112 includes a coupled transformer, with a parallel magnetizing inductor ($L_m$) and a series inductor ($L_s$), also called leakage inductor. Due to the relatively high value of this series inductor, an additional series inductor may be applied.

The secondary side 102 includes diode 108 and diode 109. The secondary side 102 further includes a capacitor and output voltage $V_{out}$ 111. The secondary side includes components of a conventional SMPS that may be adapted to embodiments of this invention.

The primary side 101 and the secondary side 102 are connected by mutually coupled inductors 112, also called a transformer 112.

A controller 114 provides the controlling drive signals HSDRIVER 116 to the high side transistor 104 and LSDRIVER 118 the low side transistor 105, to control with each transistor is turned on and off. Further, the controller 114 may receive a signal OUTPUT POWER 120 indicative of the output power of the converter. This power value may be measured using various known methods and provided to the controller also using known methods. This signal may include a measure of the output voltage and/or output current or a direct measure of the output power.

Figure 2:
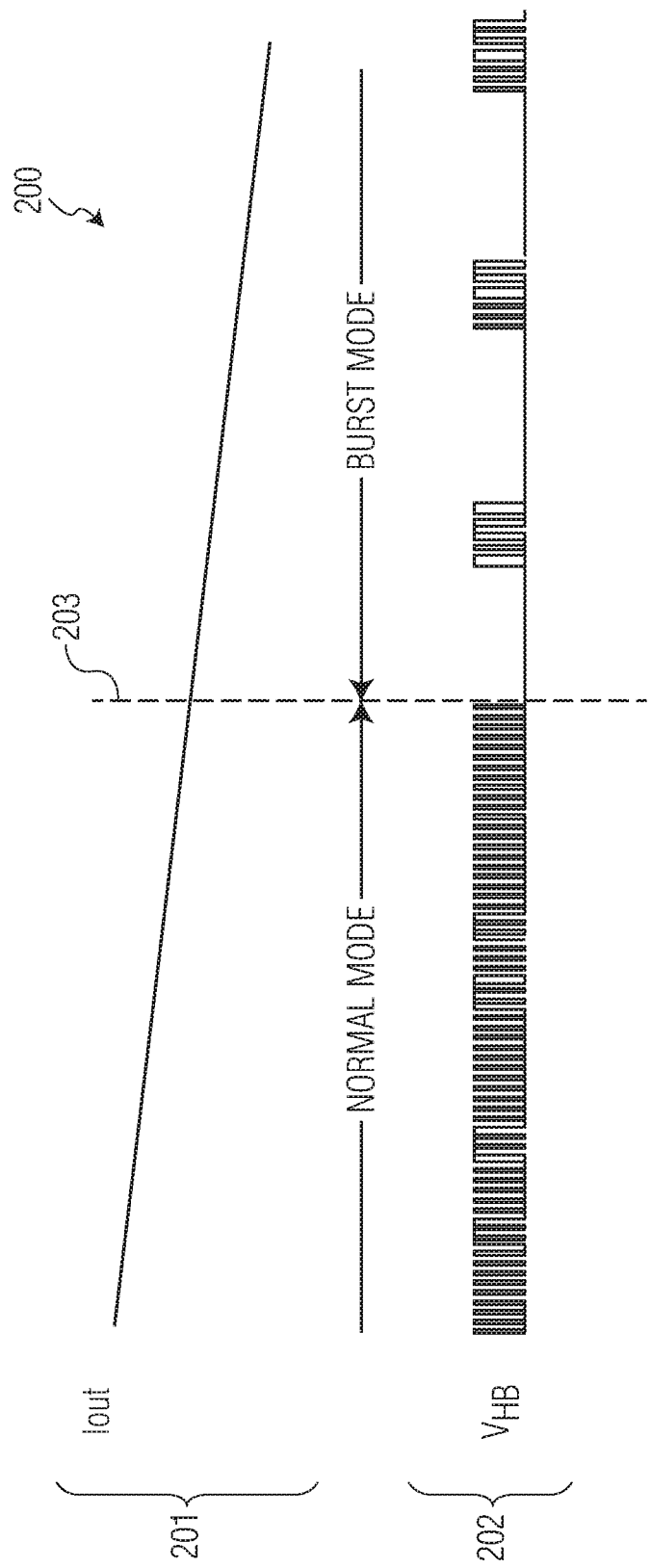
FIG. 2 illustrates a timing diagram for the power converter of FIG. 1 operating in normal mode and entering burst mode.

FIG. 2 illustrates a timing diagram 200 for the SMPS circuit of FIG. 1 entering burst mode.

FIG. 2 includes timing diagrams for output power 201 (indicated by the output current Iout) and half bridge voltage 202. As illustrated, when the output power 201 falls below a threshold level 203, the SMPS enters burst mode.

Figure 3:
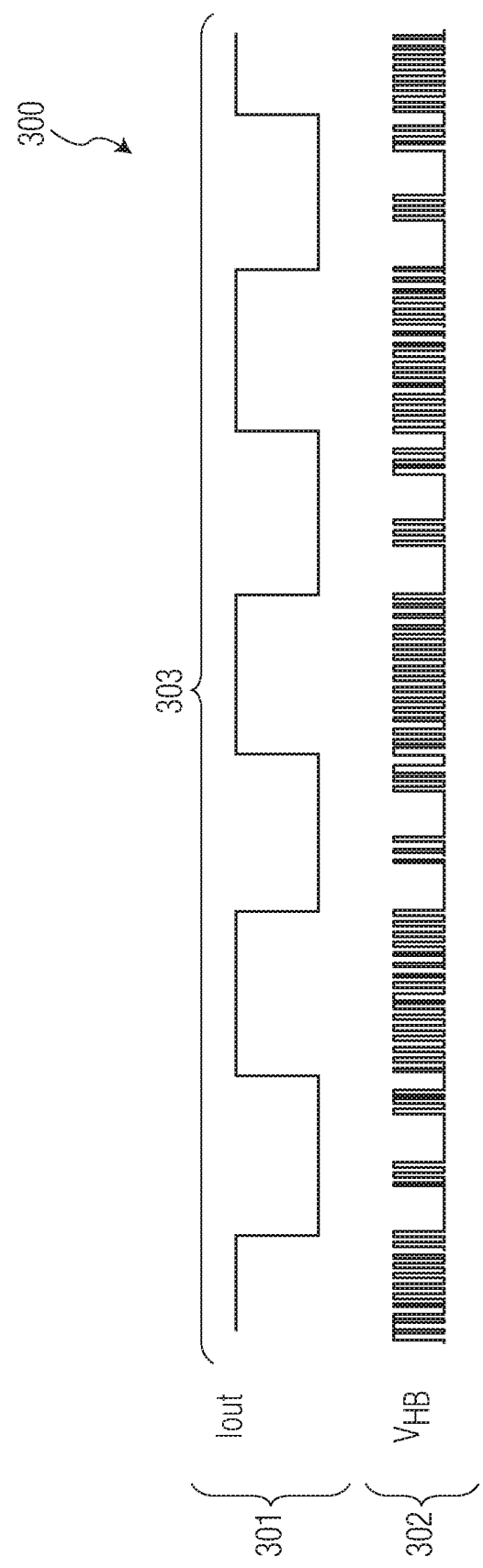
FIG. 3 illustrates a timing diagram for the power converter of FIG. 1 with load transients entering burst mode.

FIG. 3 illustrates a timing diagram 300 for the SMPS circuit of FIG. 1 with load transients 303 entering burst mode.

FIG. 3 includes timing diagrams for output power 301 and half bridge voltage 302.

When the output power 301 load varies with load transients 303, with a certain frequency, that same frequency can be seen in the switching cycles and due to the characteristics of the transformer, audible noise is produced, which is a disadvantage of using burst mode in a SMPS system.

Figure 4:
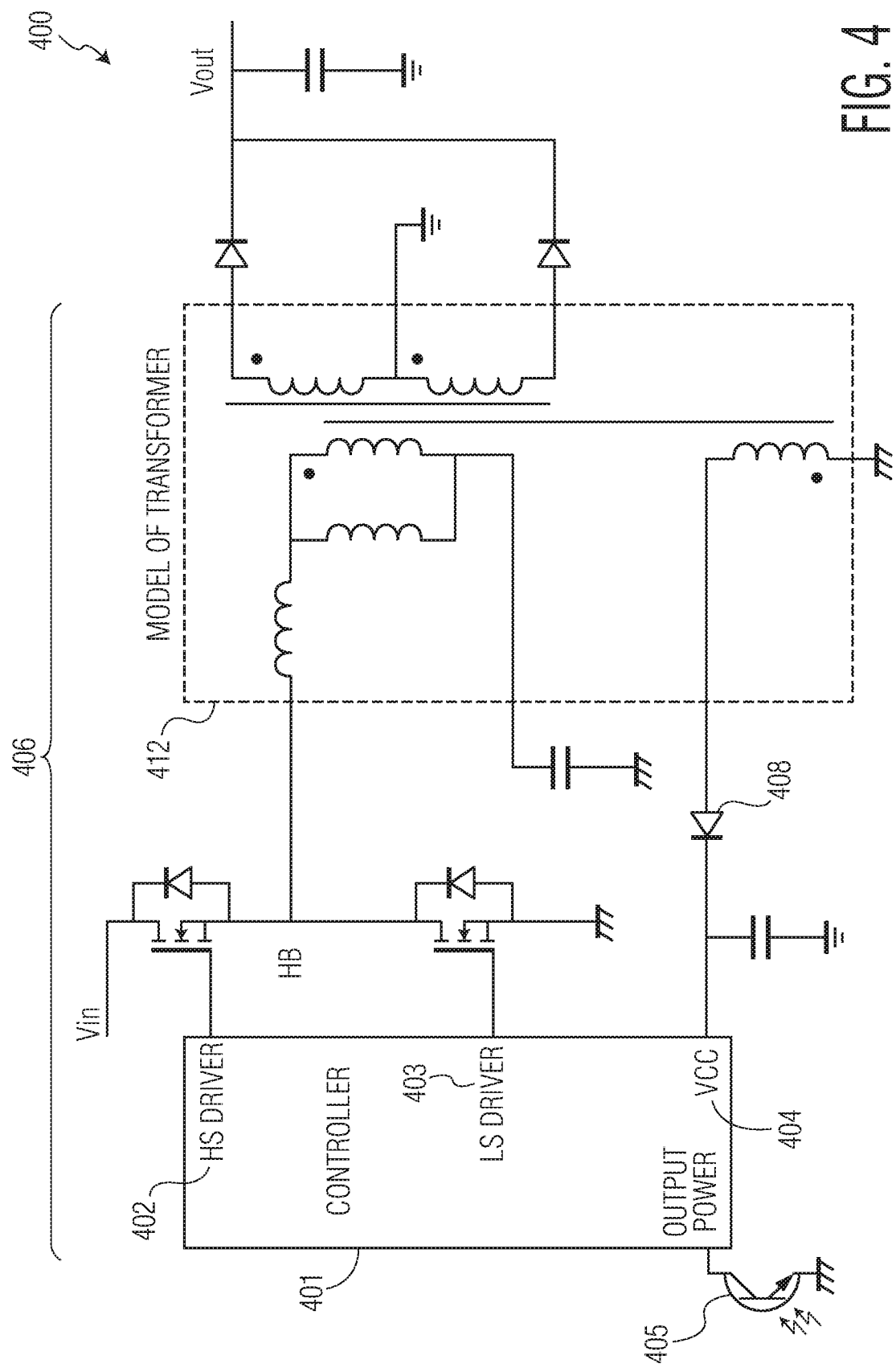
FIG. 4 illustrates a circuit diagram of a power converter using a LCC resonant converter and a controller.

FIG. 4 illustrates a circuit diagram of a SMPS circuit 400.

The SMPS circuit 400 is identical to the SMPS circuit in FIG. 1, however, the SMPS circuit 400 includes an integrated chip ("IC") controller 401 which includes a high side driver 402 for the high side N-channel MOSFET and a low side driver 403 for the low side N-channel MOSFET. The controller 401 includes components of a conventional controller that may be adapted to embodiments of this invention.

The controller 401 further includes primary VCC voltage 404 which is the input power for the controller 401. An input OUTPUT POWER may receive a signal indicative of the output power of the converter. This is case a photosensitive detector 405 is used to receive this signal in order to provide isolation from the secondary side of the transformer.

The primary side 406 includes, in addition to the primary side on FIG. 1, a parallel LC resonant circuit 407 and a diode 408 to produce the VCC voltage 404, which is part of the schematic representative of the transformer 412.

An overshoot on the output voltage may result due to the output power falling from a maximum power load to a minimum power load. Because of the overshoot, the SMPS system stops switching and Δt is required to elapse before the SMPS system begins switching again, in burst mode, as the output power has fallen below the minimum burst mode threshold.

Figure 5:
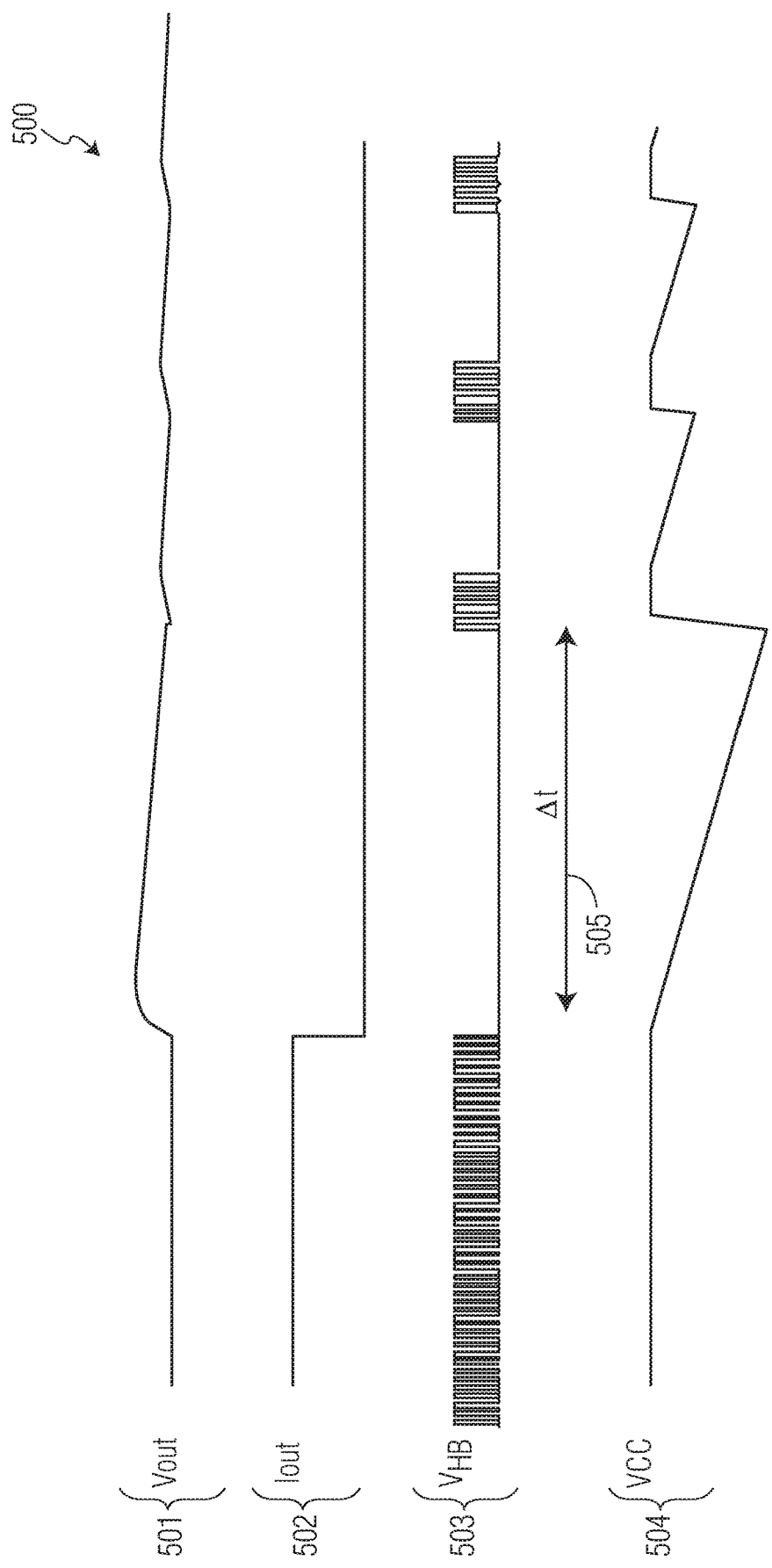
FIG. 5 illustrates a timing diagram for the power converter of FIG. 4 with an overshoot on the output voltage and entering burst mode.

FIG. 5 illustrates a timing diagram 500 for the SMPS circuit of FIG. 4 with an overshoot entering burst mode.

FIG. 5 includes timing diagrams for voltage output 501, current output 502, voltage half bridge 503 and primary VCC voltage 504.

As illustrated in FIG. 5, when the output current 502 falls from a maximum power level to a minimum power level, the output voltage 501 has an overshoot.

Due to the overshoot in the output voltage 501, a longer time (Δt) 505 is required before the SMPS systems starts switching again. During the non-switching period, the primary VCC voltage 504 is discharged and may drop below minimum level required for operation.

The SMPS system stops switching after an overshoot results on the output voltage (when the output power falls from a maximum power load to a minimum power load) and starts switching again after entering burst mode, as the output power is below the minimum burst mode threshold level.

Figure 6:
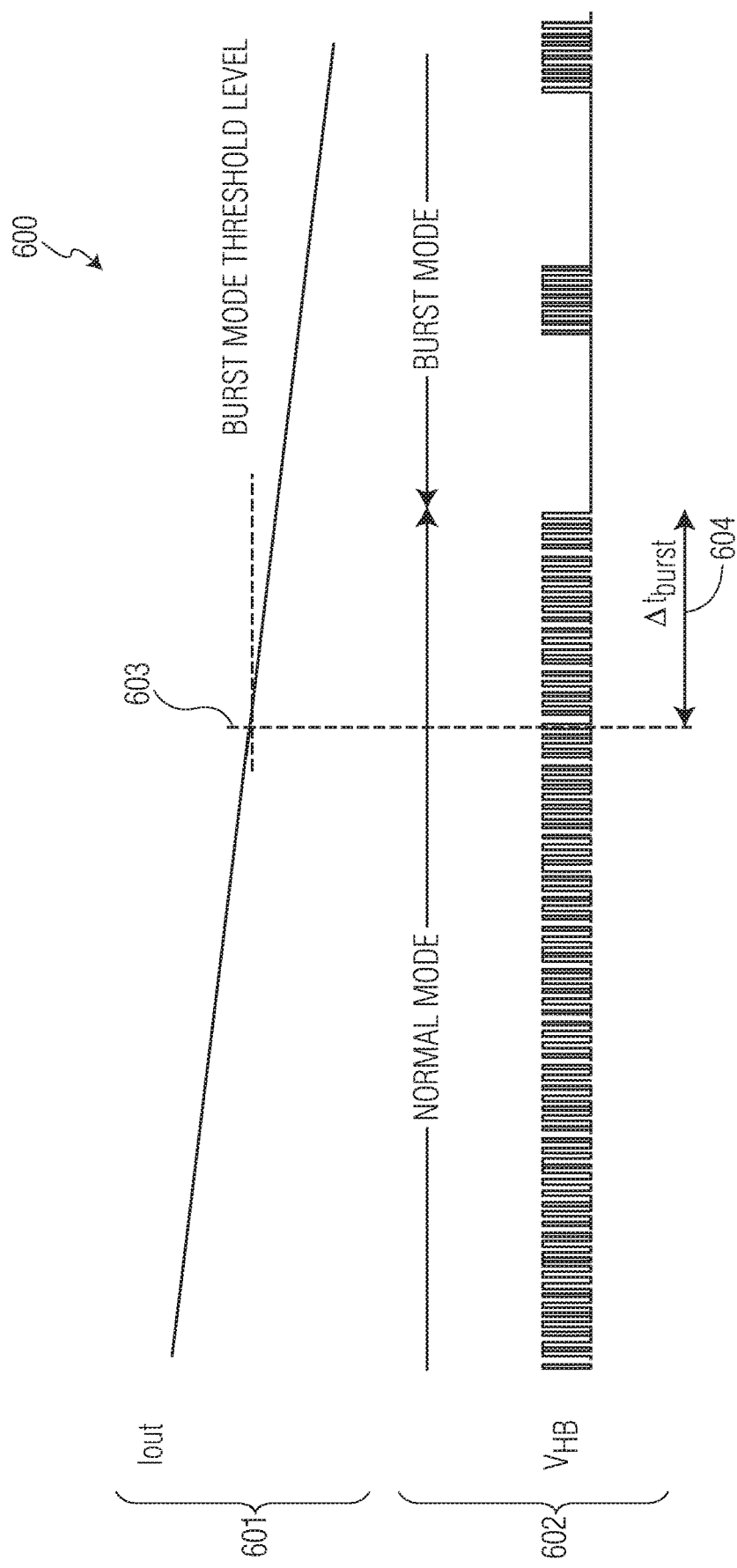
FIG. 6 illustrates a timing diagram for the power converter of FIG. 1 operating in normal mode and delay entering burst mode.

FIG. 6 illustrates a timing diagram 600 for the power converter of FIG. 1 operating in normal mode and delay entering burst mode.

When the output power 601 falls below the burst mode threshold level 603, the SMPS would enter burst mode immediately, as previously seen in FIG. 2.

However, in this embodiment, the SMPS initially continues switching in the normal mode and after a predefined time ($\Delta t_{burst}$) 604, the SMPS may enter burst mode. While the SMPS continues to switch in the normal mode at a frequency between, for example, 70 KHz to 100 KHz (most resonant converters switch in this range, but it is not limited to this frequency and some converters even go to 1 MHz), outside of the audible area field, there is no audible noise when the SMPS initially continues to switch at the lower energy for the predefined timing period, $\Delta t_{burst}$ 604.

The value of $\Delta t_{burst}$ may be set by the user of the SMPS system. The value of $\Delta t_{burst}$ will depend on the application of the SMPS power system. For example, the value of $\Delta t_{burst}$ may be on the order of 1 second.

If during the $\Delta t_{burst}$ time 604, the output power 601 increases above the power level again, the $\Delta t_{burst}$ timer restarts from zero again until the power level falls below the burst mode threshold level.

During the $\Delta t_{burst}$ period, the energy content per switching cycle is reduced such that the output voltage requirement is met at the same frequency as a normal operating mode. To assure that the energy content per switching cycle is reduced to zero, the frequency slightly increases.

The $\Delta t_{burst}$ period may be chosen such that for load changes in the audible area field (typically in the range of 1 KHz to 20 KHz), the SMPS does not enter burst mode. On the other hand, as the efficiency of the switching converter is lower compared to a converter operating in burst mode, the decrease of efficiency should be minimized. Therefore, a delay of approximately 1 second is an appropriate value, which is way beyond the requirement of 1 KHz and provides a neglectable efficiency loss.

Figure 7:
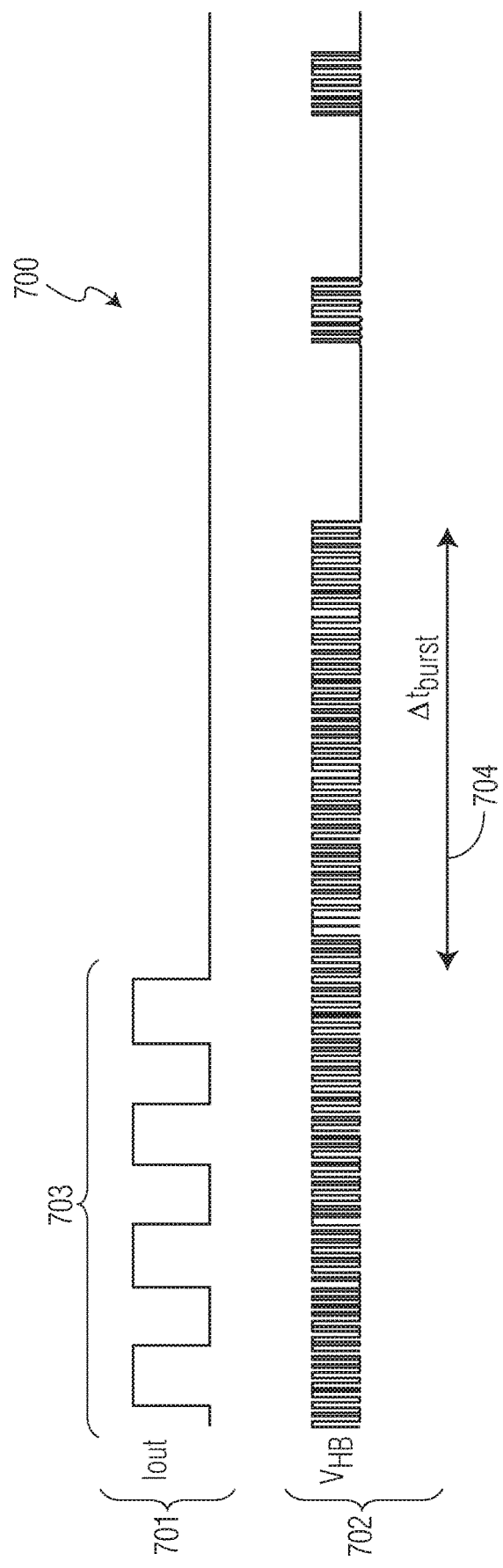
FIG. 7 illustrates a timing diagram for the power converter of FIG. 1 with load transients and delay entering burst mode.

FIG. 7 illustrates a timing diagram 700 for the SMPS circuit of FIG. 1 with load transients and delay entering burst mode.

Similar to FIG. 3, FIG. 7 illustrates timing diagrams for output power 701 and voltage high bridge 702.

However, in this embodiment, illustrated in FIG. 7, during the load transients 703, the SMPS system continues switching at around the same frequency and as the switching frequency is above the audible area field, typically around 100 KHz during these load transients, the audible noise is minimized, as it is above the audible area field.

When the output power load 701 is below the burst mode threshold level for a minimum time of $\Delta t_{burst}$ 704, the SMPS system enters burst mode.

As seen in FIG. 7, even though the output power falls below the minimum burst mode threshold during the load transients 703, it does not fall below for the prescribed amount of time, $\Delta t_{burst}$ 704, however, once it does fall for that period of time, the SMPS system may enter burst mode.

Figure 8:
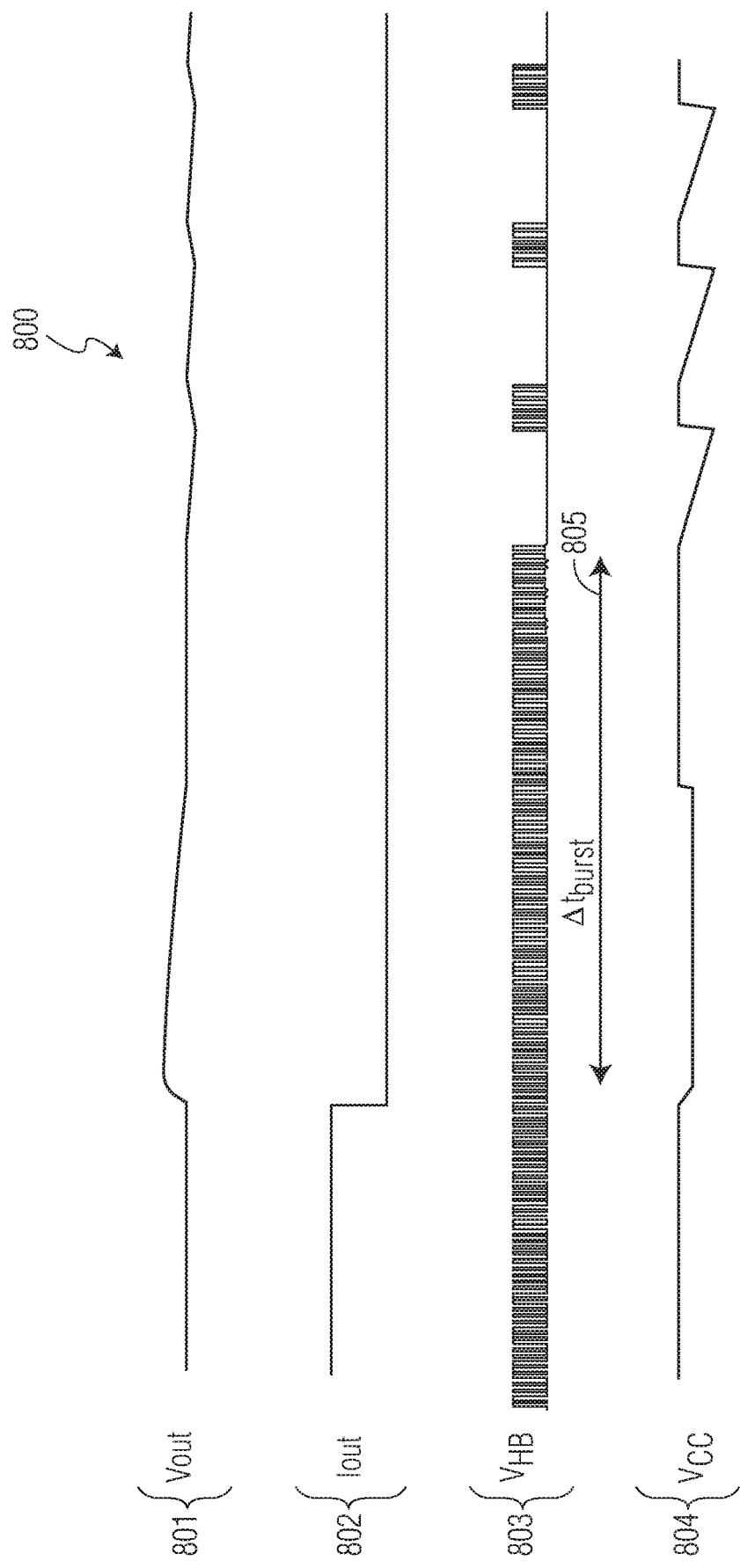
FIG. 8 illustrates a timing diagram for the power converter of FIG. 4 with an overshoot on the output voltage and delay entering burst mode.

FIG. 8 illustrates a timing diagram for the SMPS circuit of FIG. 4 with an overshoot and delay entering burst mode.

Similar to FIG. 5, FIG. 8 illustrates timing diagrams for voltage output 801, current output 802, voltage half bridge 803 and primary VCC voltage 804.

When the output current 802 falls from a maximum power load to a minimum power load, the output voltage 801 shows an overshoot, similar to FIG. 5.

However, in this embodiment, as the converter continues switching, to guarantee that no load is transferred to the output, the switching frequency slightly increases. As a result, the voltage at the VCC 804 slightly decreases, but remains at a much higher level (as compared to FIG. 5), which may drop to zero volts.

When the output voltage 801 then drops to regulation level, the converter continues switching at normal switching frequency, delivering load to the output. The VCC voltage 804 then follows the output voltage 801 again, and after a delay of $\Delta t_{burst}$, the system enters burst mode.

The large (as compared to FIG. 5) primary VCC voltage 804 drop is avoided and the output voltage remains above a minimum level.

After the $\Delta t_{burst}$ 805 period, as the output power is below the minimum burst mode threshold, the SMPS system enters burst mode.

Figure 9:
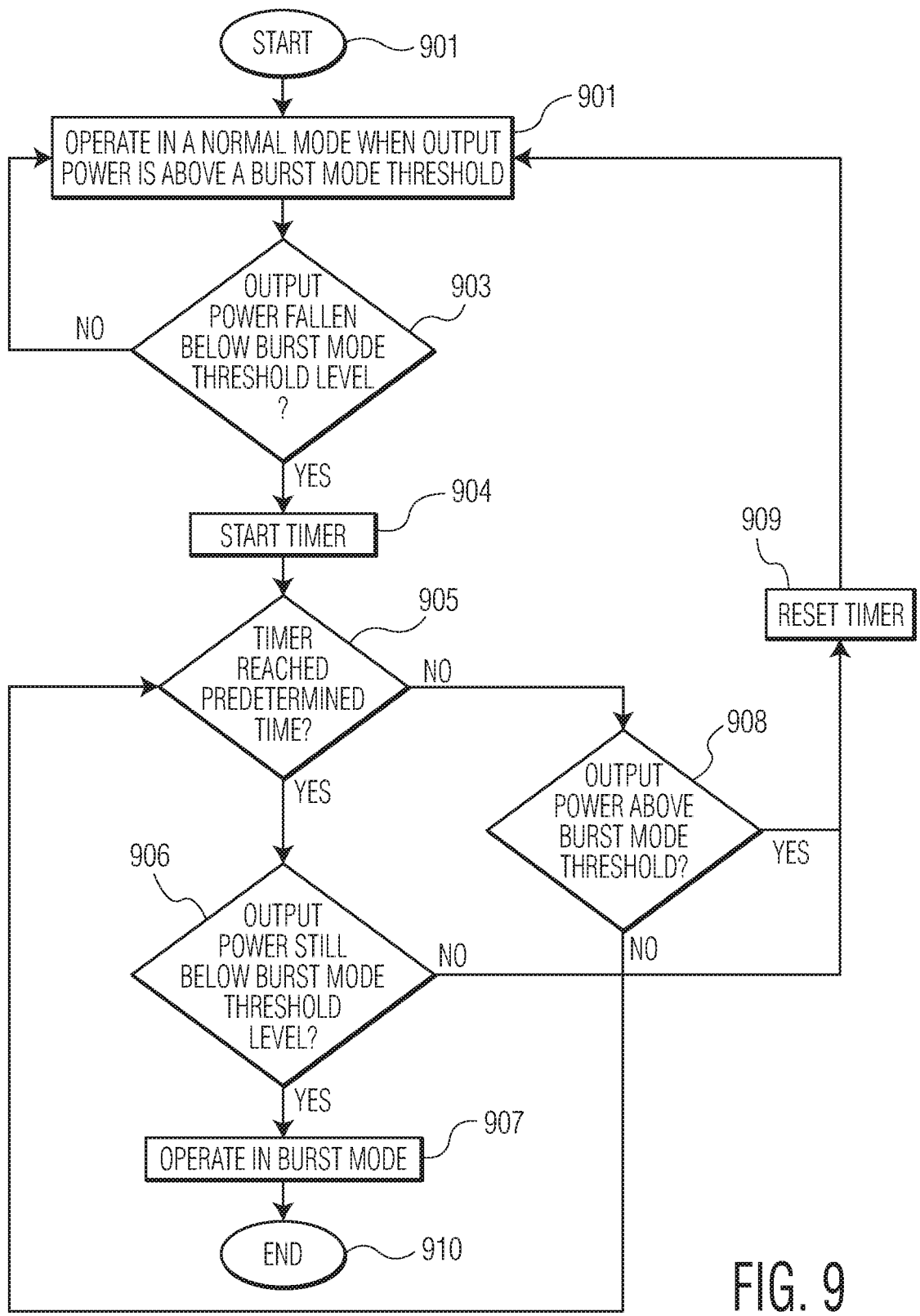
FIG. 9 illustrates a flow diagram for the method of delay entering burst mode in a power converter.

FIG. 9 illustrates a method 900 for delay entering burst mode in a power converter.

The method 900 begins at step 901.

The method 900 proceeds to step 901 where the power converter operates in a normal mode when the output power is above a burst mode threshold level.

The method 900 then proceeds to step 903 to determine whether the output power level has fallen below the burst mode threshold level. If yes, the method 900 proceeds to step 904 where a timer is started. If no, the method 900 proceeds back to step 902.

The method 900 then proceeds to step 905 to determine if the timer has reached the predetermined time? If yes, the method 900 proceeds to step 906 to determine if the output power is still below the burst mode threshold level. If no, the method 900 proceeds to step 908 to determine whether the output power is above the burst mode threshold level.

The method 900 proceeds to step 907 if the output power level is still below the burst mode threshold level.

The method 900 then proceeds to step 907 which enters burst mode.

The method 900 proceeds from step 905 to step 908 if the timer has not reached the predetermined time.

The method 900 proceeds from step 906 to step 909 if the output power level is not below the burst mode threshold level.

The method 900 proceeds to step 909 if the output power level is above the burst mode threshold level. The method 900 then returns to step 902.

The method 900 proceeds back to step 905 from step 908 if the output power level is not above the burst mode threshold level.

The method 900 then proceeds to end at step 910.

Even when the system is operating in burst mode (either 907 or 910), it should enter normal operation immediately when the output power is above the burst mode threshold and the timer is reset.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A power converter comprising:
   a resonant converter, and
   a controller configured to control the resonant converter to:
   operate in a normal mode with constant switching when output power is above a burst mode threshold level;
   start a timer when the output power falls below the burst mode threshold level;
   continue operating in the normal mode until the timer reaches a predetermined time, and
   operate in a burst mode, having a switching time and a non-switching time, when the timer reaches the predetermined time.

2. The power converter of claim 1,
   wherein the controller is configured to control the resonant converter to:
   reset the timer when the output power rises above the burst mode threshold level before the timer reaches the predetermined time.

3. The power converter of claim 1,
   wherein the normal mode is continuously switching transistors to maintain a required level of the output power.

4. The power converter of claim 1,
   wherein the burst mode is switching off transistors for a period of time to supply a burst of output power.

5. The power converter of claim 1,
wherein a switching frequency of the converter during the normal mode is above an audible area and a burst frequency during the burst mode is below the audible area; and
wherein the burst frequency defines a rate at which bursts occur.

6. A method for delaying entering burst mode, by a power supply including a resonant converter and a controller, the controller performing the steps of:
operating in the converter a normal mode when an output power is above a burst mode threshold level;
starting a timer when the converter output power falls below the burst mode threshold level;
continuing to operate the converter in the normal mode until the timer reaches a predetermined time, and
operating the converter in burst mode when the timer reaches the predetermined time.

7. The method for delaying entering burst mode of claim 6,
wherein the controller is configured to reset the timer when the output power rises above the burst mode threshold level before the timer reaches the predetermined time.

8. The method for delaying entering burst mode of claim 6,
wherein the normal mode is continuously switching transistors to maintain a required level of the output power.

9. The method for delay entering burst mode of claim 6,
wherein the burst mode is switching off transistors for a period of time to supply a burst of output power.

10. The method for delay entering burst mode of claim 6,
wherein switching frequency during the normal mode is above an audible area and a burst frequency during the burst mode is below the audible area.

11. The power converter of claim 1:
wherein the controller includes an operational mode and a sleep mode; and
wherein the controller is configured to remain in the operational mode when the power converter is switching in the burst mode.

* * * * *